US010156106B2

(12) United States Patent
Roberts et al.

(10) Patent No.: US 10,156,106 B2
(45) Date of Patent: Dec. 18, 2018

(54) PRESSURE BALANCED DRILLING CHOKE

(71) Applicant: TECH ENERGY PRODUCTS, L.L.C., Bossier City, LA (US)

(72) Inventors: Todd Roberts, Bossier City, LA (US); Nischit Reddy Kadari, Bossier City, LA (US); Barton Hickie, Bossier City, LA (US)

(73) Assignee: TECH ENERGY PRODUCTS, L.L.C., Bossier City, LA (US)

( * ) Notice: Subject to any disclaimer, the term of this patent is extended or adjusted under 35 U.S.C. 154(b) by 0 days.

(21) Appl. No.: 15/790,940

(22) Filed: Oct. 23, 2017

(65) Prior Publication Data

US 2018/0334869 A1 Nov. 22, 2018

Related U.S. Application Data

(60) Provisional application No. 62/508,701, filed on May 19, 2017.

(51) Int. Cl.
*E21B 21/08* (2006.01)
*F16K 3/24* (2006.01)
*F16K 3/26* (2006.01)
*F16K 17/168* (2006.01)

(52) U.S. Cl.
CPC .............. *E21B 21/08* (2013.01); *F16K 3/243* (2013.01); *F16K 3/267* (2013.01); *F16K 17/168* (2013.01)

(58) Field of Classification Search
CPC ...................................................... E21B 21/08
USPC ....................................................... 166/91.1
See application file for complete search history.

(56) References Cited

U.S. PATENT DOCUMENTS

| 1,959,559 | A | * | 5/1934 | Williamson | ............... F04F 1/18 417/111 |
| 4,461,316 | A | * | 7/1984 | Cove | ..................... E21B 21/106 137/312 |
| 6,283,152 | B1 | * | 9/2001 | Corte, Jr. | ................ F16K 1/443 137/614.11 |
| 9,297,458 | B1 | | 3/2016 | Corte, Jr. | |

OTHER PUBLICATIONS

International Search Report and Written Opinion issued by the US International Searching Authority for International Application No. PCT/US18/32899 dated Jun. 26, 2018, 13 pages.

* cited by examiner

*Primary Examiner* — Taras P Bemko
(74) *Attorney, Agent, or Firm* — Haynes and Boone, LLP

(57) ABSTRACT

A drilling choke including a choke body defining an internal region, an inlet passage, and an outlet passage, a seat extending within the outlet passage, a nose extending within the internal region and defining a recessed region, a plug extending within the recessed region, and a stem connected to the plug and extending axially therethrough, the stem defining an internal passage. The plug can be engaged with the seat to at least partially restrict fluid flow from the inlet passage to the outlet passage via the internal region. The stem and the plug are together axially moveable in opposing directions relative to the seat to thereby control a backpressure of the fluid flow. In some embodiments, the recessed region of the nose is in fluid communication with the outlet passage of the choke body via the internal passage of the stem to thereby pressure balance the plug.

30 Claims, 12 Drawing Sheets

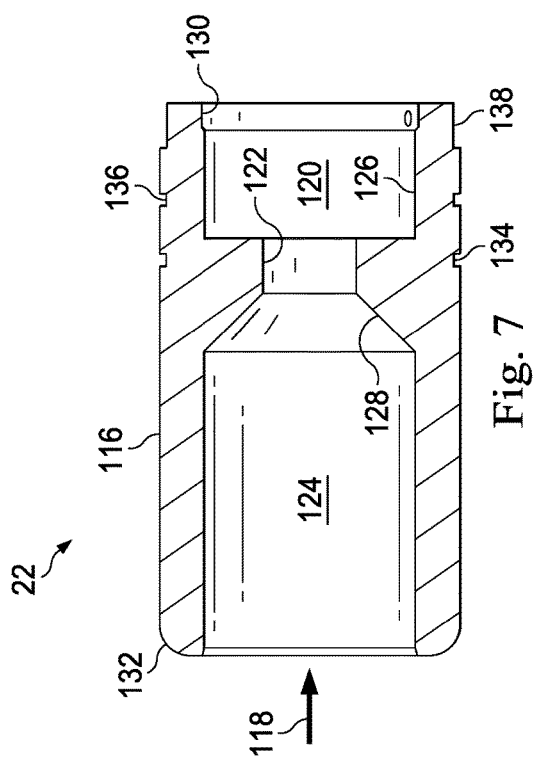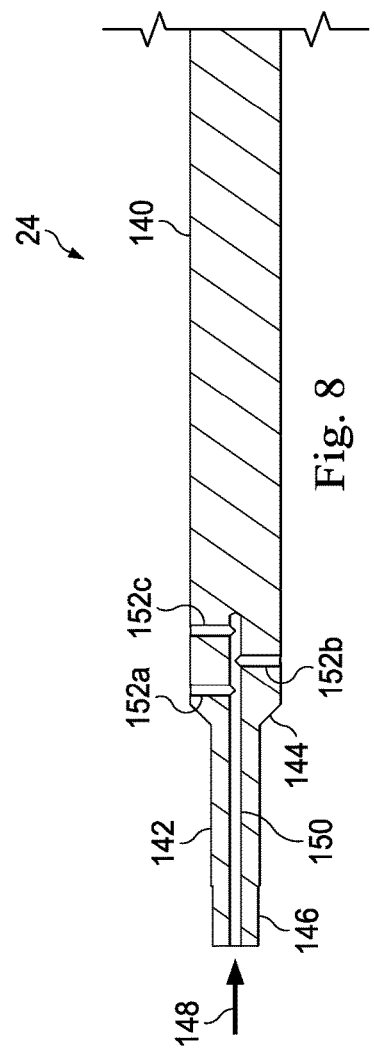

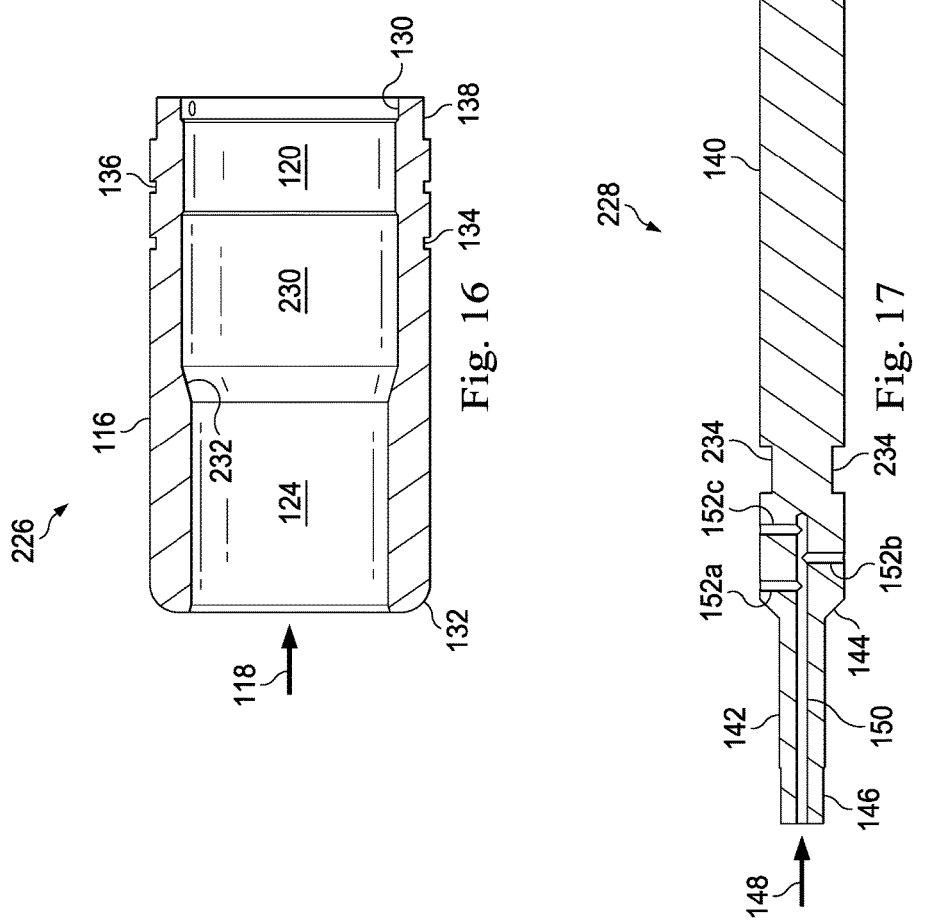

PRESSURE BALANCED DRILLING CHOKE

CROSS-REFERENCE TO RELATED APPLICATION

This application claims the benefit of the filing date of, and priority to, U.S. Application No. 62/508,701, filed May 19, 2017, the entire disclosure of which is hereby incorporated herein by reference.

TECHNICAL FIELD

The present disclosure relates generally to oil and gas exploration and production operations and, more particularly, to a pressure balanced drilling choke used during oil and gas drilling operations.

BACKGROUND

A drilling system may include drilling choke(s) in fluid communication with a wellbore that traverses a subterranean formation. As a result, the drilling choke(s) may be used to control backpressure in the wellbore as part of an adaptive drilling process that allows greater control of the annular pressure profile throughout the wellbore. In some cases, the configuration of the drilling choke(s) may decrease the efficiency of drilling operations, thereby presenting a problem for operators dealing with challenges such as, for example, continuous duty operations, harsh downhole environments, and multiple extended-reach lateral wells, among others. Indeed, the extreme drilling pressures required by today's operators often cause an elevated pressure differential across the drilling choke(s), which elevated pressure differential can cause difficulty in unseating the drilling choke(s). These challenges, among others, may cause significant wear and erosion to the various components of the drilling choke(s), thereby increasing costs associated with maintenance, downtime, and replacement parts. Finally, the configuration of the drilling choke(s) can make it difficult to inspect, service, or repair the drilling choke(s), and/or to coordinate the inspection, service, repair, or replacement of the drilling choke(s). Therefore, what is needed is an assembly, apparatus, or method that addresses one or more of the foregoing issues, and/or one or more other issues.

BRIEF DESCRIPTION OF THE DRAWINGS

FIG. 7 is a cross-sectional view illustrating the nose of FIG. 2, according to one or more embodiments.

FIG. 8 is a cross-sectional view illustrating the stem of FIG. 2, according to one or more embodiments.

FIG. 16 is a cross-sectional view illustrating a nose that may be substituted in place of the nose of FIGS. 2 and 7, according to one or more embodiments.

FIG. 17 is a cross-sectional view illustrating a stem that may be substituted in place of the stem of FIGS. 2 and 8, according to one or more embodiments.

DETAILED DESCRIPTION

Figure 1:
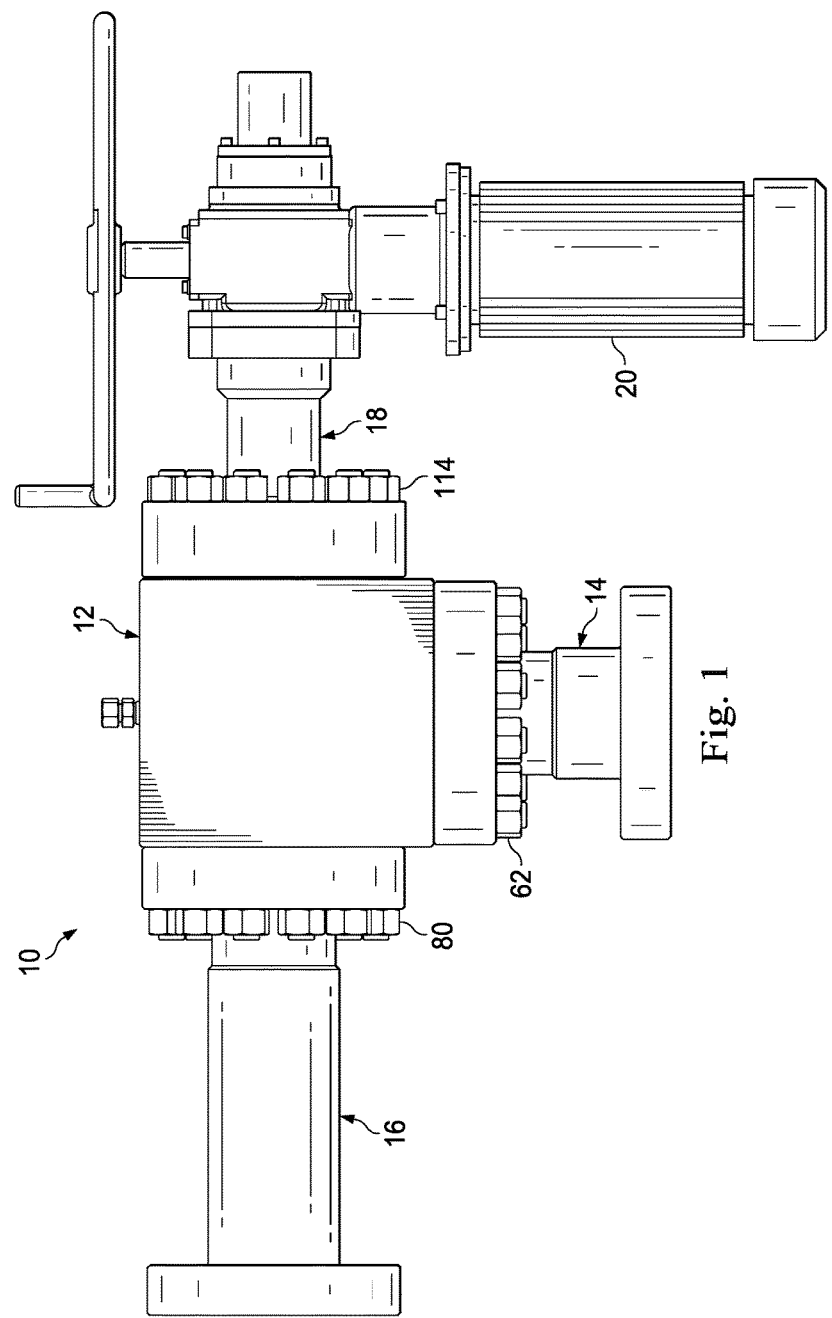
FIG. 1 is an elevational view illustrating a drilling choke, the drilling choke including a choke body, an inlet leg, an outlet leg, an actuator cap, and an actuator.
Figure 2:
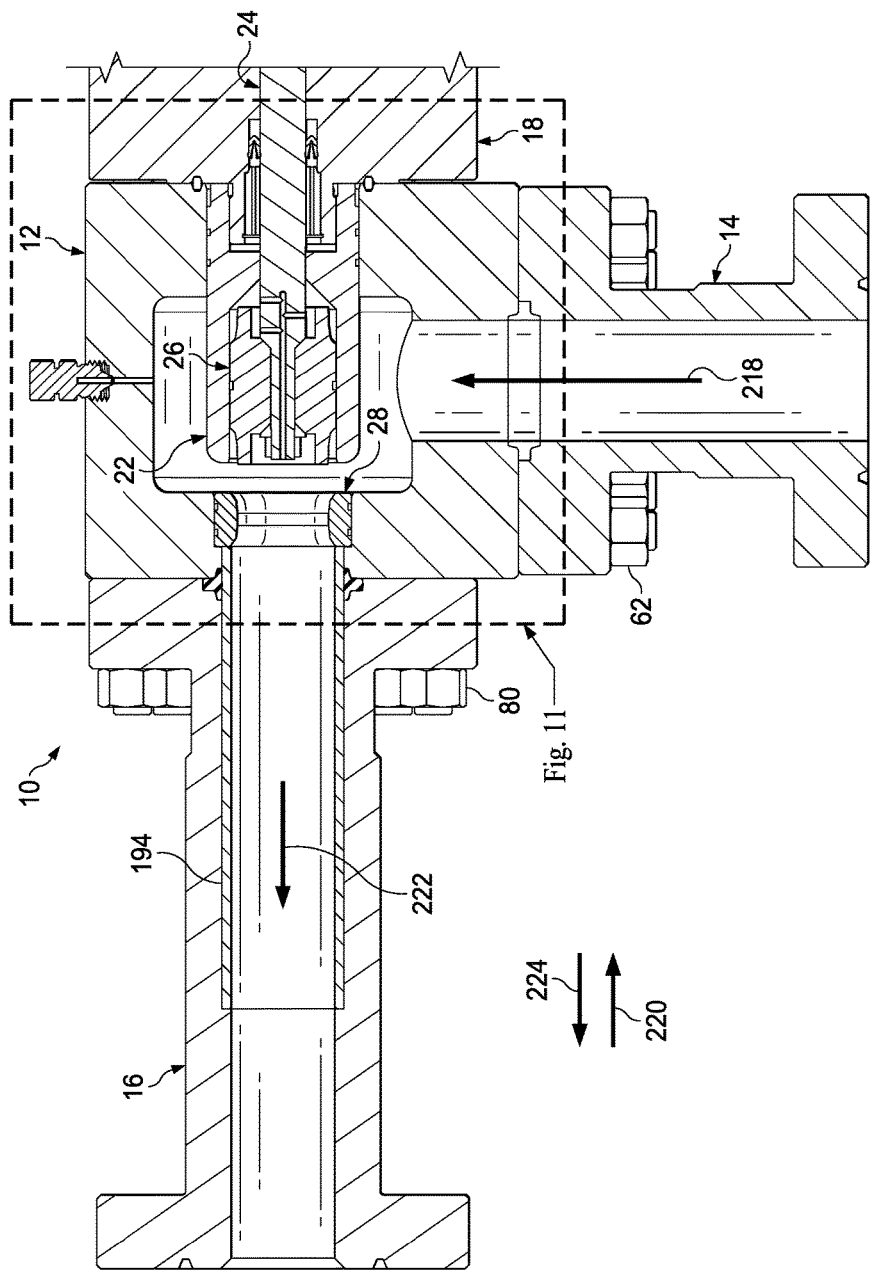
FIG. 2 is a cross-sectional view illustrating the drilling choke of FIG. 1 further including a nose, a plug, a stem, and a seat, according to one or more embodiments.

Referring initially to FIGS. 1 and 2, a drilling choke 10 is generally referred to by the reference numeral 10. The drilling choke 10 may be used as part of an adaptive drilling process to control backpressure in a wellbore (not shown) that traverses one or more subterranean formations, thereby allowing greater control of the annular pressure profile throughout the wellbore. During such an adaptive drilling process, drilling fluid is circulated to the wellbore to facilitate extending the reach or penetration of the wellbore into the one or more subterranean formations. The drilling fluid carries drill cuttings back to the surface via an annulus of the wellbore. The drilling fluid and the drill cuttings, in combination, are referred to herein as "drilling mud." The drilling choke 10 receives the drilling mud from the wellbore, and is adjustable to maintain the desired backpressure within the wellbore, as will be discussed in further detail below. In some embodiments, the drill cuttings (along with any entrained gas) are separated from the drilling fluid so that the drilling fluid may be recirculated to the wellbore to facilitate continued drilling operations. In addition to, or instead of, being used as part of an adaptive drilling process to control backpressure in a wellbore, the drilling choke 10 may be used for other oil and gas exploration and production operations such as, for example, fracturing operations. Moreover, the drilling choke 10 can be used in non-drilling operations (e.g., completion operations, production operations, etc.).

As shown in FIG. 1, the drilling choke 10 includes a choke body 12, an inlet leg 14, an outlet leg 16, an actuator cap 18, and an actuator 20. The inlet leg 14 is connected to the choke body 12 and adapted to receive the drilling mud from the wellbore. The outlet leg 16 is connected to the choke body 12 and adapted to discharge the drilling mud from the drilling choke 10. The actuator cap 18 connects the actuator 20 to the choke body 12. In some embodiments, the choke body 12 is rated for pressures of up to 15,000 PSI. In some embodiments, the inlet leg 14 and the outlet leg 16 are each rated for pressures of up to 5,000 PSI, 10,000 PSI, or 15,000 PSI. In some embodiments, the choke body 12 is rated for pressures of up to 15,000 PSI, and the inlet leg 14 and the outlet leg 16 are each rated for pressures of up to 5,000 PSI. In some embodiments, the choke body 12 is rated for pressures of up to 15,000 PSI, and the inlet leg 14 and the outlet leg 16 are each rated for pressures of up to 10,000 PSI. In some embodiments, the choke body 12, the inlet leg 14, and the outlet leg 16 are each rated for pressures of up to 15,000 PSI.

As shown in FIG. 2, the drilling choke 10 further includes a nose 22, a stem 24, a plug 26, and a seat 28. The nose 22 is connected to the actuator cap 18 and extends within the choke body 12. The stem 24 extends through at least a portion of the actuator cap 18 and into the nose 22, and is operably coupled to the actuator 20. The plug 26 extends within the nose 22, and is connected to the stem 24. The seat 28 engages the choke body 12 and is engageable by the plug 26 when the drilling choke 10 is actuated, as will be discussed in further detail below.

Figure 3:
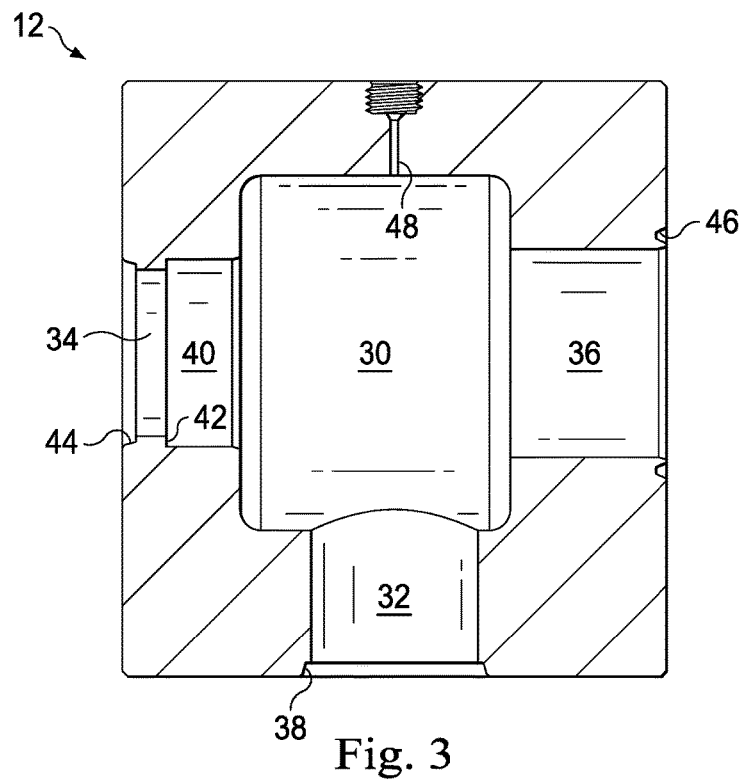
FIG. 3 is a cross-sectional view illustrating the choke body of FIGS. 1 and 2, according to one or more embodiments.

Referring to FIG. 3, with continuing reference to FIGS. 1 and 2, an illustrative embodiment of the choke body 12 is shown. The choke body 12 defines an internal region 30, an inlet passage 32, an outlet passage 34, and an actuator bore 36. The inlet passage 32 permits fluid communication between the inlet leg 14 and the internal region 30. In some embodiments, to facilitate connecting of the inlet leg 14 to the choke body 12, a threaded-hole pattern (not visible in FIG. 3) is formed in the choke body 12 around the inlet passage 32. A sealing groove 38 is formed in the choke body 12 adjacent the inlet passage 32 to facilitate a sealing engagement between the inlet leg 14 and the choke body 12 when the inlet leg 14 is connected to the choke body 12.

The outlet passage 34 permits fluid communication between the internal region 30 and the outlet leg 16, and includes an enlarged-diameter region 40 defining an internal shoulder 42 in the choke body 12. The enlarged-diameter region 40 is adapted to accommodate the seat 28 adjacent the internal shoulder 42. In some embodiments, to facilitate connecting of the outlet leg 16 to the choke body 12, a threaded-hole pattern (not visible in FIG. 3) is formed in the choke body 12 around the outlet passage 34. A sealing groove 44 is formed in the choke body 12 adjacent the outlet passage 34 to facilitate a sealing engagement between the outlet leg 16 and the choke body 12 when the outlet leg 16 is connected to the choke body 12.

The actuator bore 36 permits the extension of the nose 22, the plug 26, and the stem 24 within the choke body 12. In some embodiments, the actuator bore 36 is generally cylindrical. In some embodiments, to facilitate connecting of the actuator cap 18 to the choke body 12, a threaded-hole pattern (not visible in FIG. 3) is formed in the choke body 12 around the actuator bore 36. A sealing groove 46 is formed in the choke body 12 around the actuator bore 36 to facilitate a sealing engagement between the actuator cap 18 and the choke body 12 when the actuator cap 18 is connected to the choke body 12. In some embodiments, an aperture 48 extends into the internal region 30 so that instrumentation such as, for example, a pressure gauge (not shown) may be connected to the choke body 12 in fluid communication with the internal region 30.

Figure 4:
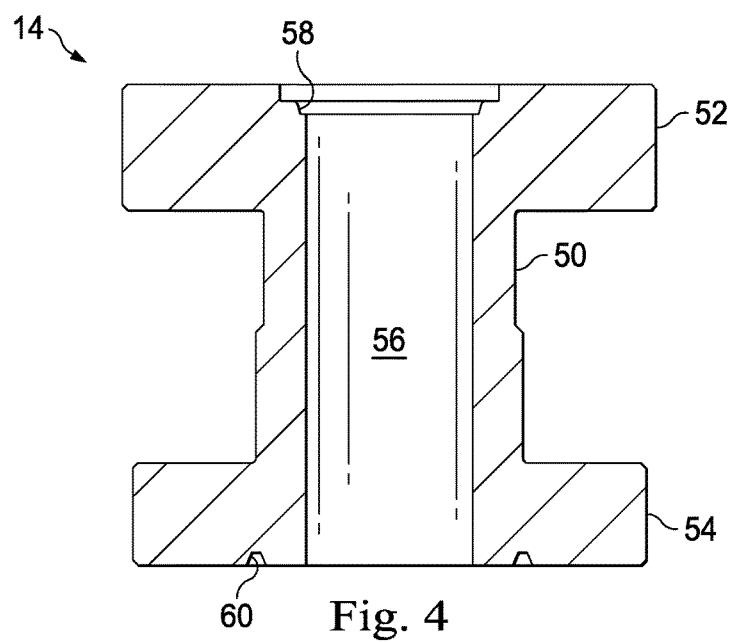
FIG. 4 is a cross-sectional view illustrating the inlet leg of FIGS. 1 and 2, according to one or more embodiments.

Referring to FIG. 4, with continuing reference to FIGS. 1 and 2, an illustrative embodiment of the inlet leg 14 is shown. The inlet leg 14 includes a spool 50, opposing flanges 52 and 54, and an internal passage 56. The opposing flanges 52 and 54 are connected to the spool 50 at opposing end portions thereof. The internal passage 56 extends axially through the spool 50 and the opposing flanges 52 and 54. In some embodiments, to facilitate connecting of the inlet leg 14 to the choke body 12, a through-hole pattern (not visible in FIG. 4) is formed in the flange 52. A sealing groove 58 is formed in or adjacent the flange 52 and adjacent the internal passage 56 to facilitate the sealing engagement between the inlet leg 14 and the choke body 12 when the inlet leg 14 is connected to the choke body 12. Similarly, to facilitate a sealing engagement between the inlet leg 14 and another flow line component, a sealing groove 60 may be formed in or adjacent the flange 54. The inlet leg 14 is adapted to be connected to the choke body 12 by a plurality of fasteners 62 (shown in FIGS. 1 and 2) extending through the through-holes in the flange 52 and threadably engaging the threaded-holes around the inlet passage 32 in the choke body 12. In addition to, or instead of, being connected to the choke body 12 via the plurality of fasteners 62, the inlet leg 14 may be connected to the choke body 12 in another suitable manner (e.g., threaded engagement, welding, clamping, etc.).

Figure 5:
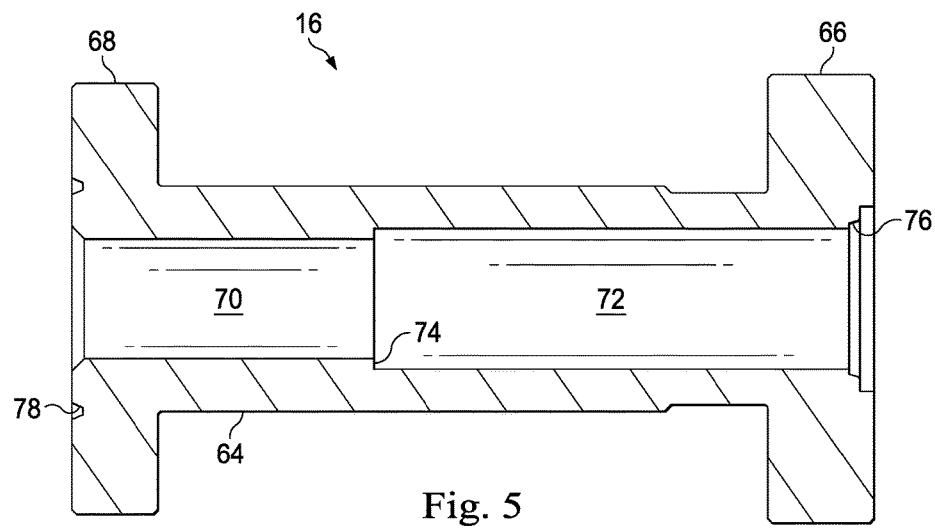
FIG. 5 is a cross-sectional view illustrating the outlet leg of FIGS. 1 and 2, according to one or more embodiments.

Referring to FIG. 5, with continuing reference to FIGS. 1 and 2, an illustrative embodiment of the outlet leg 16 is shown. The outlet leg 16 includes a spool 64, opposing flanges 66 and 68, and an internal passage 70. The opposing flanges 66 and 68 are connected to the spool 64 at opposing end portions thereof. The internal passage 70 extends axially through the spool 64 and the opposing flanges 66 and 68. Moreover, the internal passage 70 includes an enlarged-diameter region 72 defining an internal shoulder 74 in the outlet leg 16. The enlarged-diameter region 72 extends through the flange 66 and is adapted to accommodate a bushing (not shown in FIG. 5) adjacent the internal shoulder 74. In some embodiments, to facilitate connecting of the outlet leg 16 to the choke body 12, a through-hole pattern (not visible in FIG. 5) is formed in the flange 66. A sealing groove 76 is formed in or adjacent the flange 66 and adjacent the internal passage 70 to facilitate the sealing engagement between the outlet leg 16 and the choke body 12 when the outlet leg 16 is connected to the choke body 12. Similarly, to facilitate a sealing engagement between outlet leg 16 and another flow line component, a sealing groove 78 is formed in or adjacent the flange 68 and around the internal passage 70. The outlet leg 16 is adapted to be connected to the choke body 12 by a plurality of fasteners 80 (shown in FIGS. 1 and 2) extending through the through-holes in the flange 66 and threadably engaging the threaded-holes around the outlet passage 34 in the choke body 12. In addition to, or instead of, being connected to the choke body 12 via the plurality of fasteners 80, the outlet leg 16 may be connected to the choke body 12 in another suitable manner (e.g., threaded engagement, welding, clamping, etc.).

Figure 6:
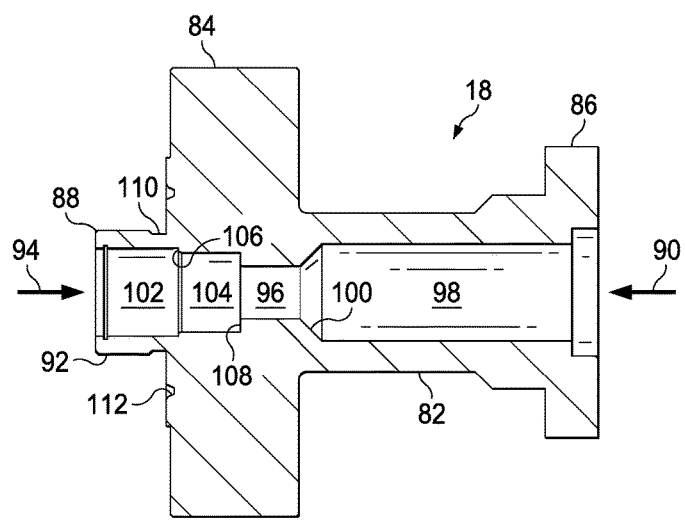
FIG. 6 is a cross-sectional view illustrating the actuator cap of FIGS. 1 and 2, according to one or more embodiments.

Referring to FIG. 6, with continuing reference to FIGS. 1 and 2, an illustrative embodiment of the actuator cap 18 is shown. The actuator cap 18 includes a spool 82, opposing flanges 84 and 86, a packing body 88, and an internal passage 90. The opposing flanges 84 and 86 are connected to the spool 82 at opposing end portions thereof. The packing body 88 is connected to the flange 84 and extends axially therefrom, opposite the spool 82. In some embodiments, the packing body 88 includes an external threaded connection 92 to facilitate connecting of the packing body 88 to the nose 22.

The internal passage 90 extends axially through the spool 82, the opposing flanges 84 and 86, and the packing body 88. The internal passage 90 includes a packing box 94, a throat region 96, and a recessed region 98. The recessed region 98 extends within the spool 82 and the flange 86. The throat region 96 extends adjacent the recessed region 98. The recessed region 98 defines an internal tapered surface 100 in the actuator cap 18 adjacent the throat region 96. The packing box 94 extends adjacent the throat region 96, within the flange 84, and through the packing body 88. The packing box 94 includes an enlarged-diameter region 102 and a reduced-diameter region 104. The enlarged-diameter region 102 of the packing box 94 extends within the packing body 88 and defines an internal shoulder 106 in the actuator cap 18 adjacent the reduced-diameter region 104. The reduced-diameter region 104 of the packing box 94 extends within the flange 84 and defines an internal shoulder 108 in the actuator cap 18 adjacent the throat region 96.

The packing body 88 includes a sealing groove 110 adjacent the external threaded connection 92 to facilitate exclusion of debris from, for example, the packing box 94 when the actuator cap 18 is connected to the nose 22. In some embodiments, to facilitate connecting of the actuator cap 18 to the choke body 12, a through-hole pattern (not visible in FIG. 6) is formed in the flange 84. A sealing groove 112 is formed in the flange 84 to facilitate the sealing engagement between the actuator cap 18 and the choke body 12 when the actuator cap 18 is connected to the choke body 12. The actuator cap 18 is adapted to be connected to the choke body 12 by a plurality of fasteners 114 (shown in FIG. 1) extending through the through-holes in the flange 84 and threadably engaging the threaded-holes around the actuator bore 36 in the choke body 12. In addition to, or instead of, being connected to the choke body 12 via the plurality of fasteners 114, the actuator cap 18 may be connected to the choke body 12 in another suitable manner (e.g., threaded engagement, welding, clamping, etc.).

Referring to FIG. 7, with continuing reference to FIG. 2, an illustrative embodiment of the nose 22 is shown. The nose 22 includes an external surface 116 and an internal passage 118. In some embodiments, the external surface 116 is generally cylindrical. The internal passage 118 extends axially through the nose 22. The internal passage 118 includes a receptacle region 120, a throat region 122, and a recessed region 124. The receptacle region 120 is adapted to receive the packing body 88 of the actuator cap 18. To facilitate connecting of the nose 22 to the packing body 88, the receptacle region 120 includes an internal threaded connection 126. The recessed region 124 is formed in the nose 22 opposite the receptacle region 120. The throat region 122 extends adjacent the recessed region 124. The recessed region 124 defines an internal tapered surface 128 in the nose 22 adjacent the throat region 122. The receptacle region 120 also extends adjacent the throat region 122, opposite the recessed region 124.

The nose 22 includes a sealing groove 130 adjacent the internal threaded connection 126 to facilitate exclusion of debris from, for example, the packing box 94 when the nose 22 is connected to the actuator cap 18. A rounded surface 132 is formed in the nose 22 adjacent the external surface 116. The rounded surface 132 extends about the recessed region 124 of the nose 22. A sealing groove 134 is formed in the external surface 116 to facilitate a sealing engagement between the nose 22 and the choke body 12 when the nose 22 extends within the choke body 12. In addition to, or instead of, the sealing groove 134, a sealing groove 136 may be formed in the external surface 116 to facilitate the sealing engagement between the nose 22 and the choke body 12 when the nose 22 extends within the choke body 12. In some embodiments, to facilitate exclusion of debris from the sealing grooves 134 and 136, the nose 22 further includes a sealing groove 138 formed in an end portion of the nose 22 opposite the rounded surface 132. The sealing groove 138 extends about the receptacle region 120 of the nose 22.

Referring to FIG. 8, with continuing reference to FIG. 2, an illustrative embodiment of the stem 24 is shown. The stem 24 includes an enlarged-diameter portion 140 and a reduced-diameter portion 142. In some embodiments, the enlarged-diameter portion 140 and the reduced-diameter portion 142 are generally cylindrical. The stem 24 includes an external tapered surface 144 extending axially between the enlarged-diameter portion 140 and the reduced-diameter portion 142. To facilitate connecting of the plug 26 to the stem 24, an external threaded connection 146 is formed in the stem 24 at or near an end portion of the reduced-diameter portion 142 opposite the enlarged-diameter portion 140. In some embodiments, to facilitate the operable coupling of the stem 24 to the actuator 20, a transversely-extending hole (not shown) is formed in the stem 24 at or near an end portion of the enlarged-diameter portion 140 opposite the reduced-diameter portion 142. In addition to, or instead of, the transversely-extending hole, to facilitate the operable coupling of the stem 24 to the actuator 20, an external threaded connection (not shown) is formed in the stem 24 at or near the end portion of the enlarged-diameter portion 140 opposite the reduced-diameter portion 142. In addition to, or instead of, the transversely-extending hole or the external threaded connection, to facilitate the operable coupling of the stem 24 to the actuator 20, the stem 24 may include another feature(s) (e.g., one or more grooves, notches, recesses, latches, pins, etc.) at or near the end portion of the enlarged-diameter portion 140 opposite the reduced-diameter portion 142.

The stem 24 includes an internal passage 148 formed in the end portion of the reduced-diameter portion 142, and extending longitudinally therethrough into the enlarged-diameter portion 140. The internal passage 148 includes an axially-extending portion 150 and one or more laterally-extending portions 152a-c extending from the axially-extending portion 150 to an exterior of the enlarged-diameter portion 140. In some embodiments, the laterally-extending portions 152a-c extend radially from the axially-extending portion 150 to the exterior of the enlarged-diameter portion 140. As shown in FIG. 8, the laterally-extending portions 152a and 152c extend in the same radial direction, and the laterally-extending portion 152b extends in a radial direction opposite the radial direction in which the laterally-extending portions 152a and 152c extend. In some embodiments, at least one of the laterally-extending portions 152a-c extends in a different radial direction than at least one other of the laterally-extending portions 152a-c. In some embodiments, the laterally-extending portion 152a is axially offset from the laterally-extending portion 152b by a first dimension, and the laterally-extending portion 152b is axially offset from the laterally-extending portion 152c by a second dimension. In some embodiments, the first dimension is substantially the same as the second dimension. In some embodiments, the axial offset of the laterally-extending portions 152a-c from one another prevents, or at least reduces, any weakening of the stem 24 that may have been caused by formation of the laterally-extending portions 152a-c therein. Although described herein as including the axially-extending portion 150 and the laterally-extending portions 152a-c, the internal passage 148 may instead include another feature(s) (e.g., angularly extending portion(s), curved portion(s), etc.).

Figure 9:
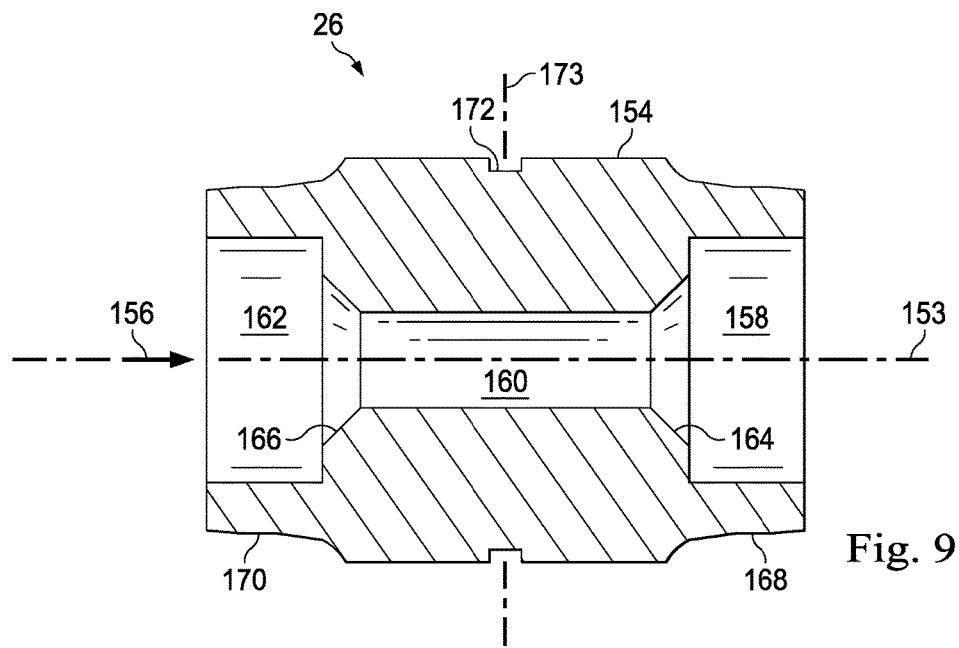
FIG. 9 is a cross-sectional view illustrating the plug of FIG. 2, according to one or more embodiments.

Referring to FIG. 9, with continuing reference to FIG. 2, an illustrative embodiment of the plug 26 is shown. The plug 26 extends along an axis 153 and includes an external surface 154 and an internal passage 156. In some embodiments, the external surface 154 is generally cylindrical. The internal passage 156 extends axially through the plug 26. The internal passage 156 includes a recessed region 158, a throat region 160, and a recessed region 162. The recessed regions 158 and 162 are formed in opposing end portions of the plug 26. The throat region 160 extends axially between the recessed regions 158 and 162. The recessed region 158 defines an internal tapered surface 164 in the plug 26 adjacent the throat region 160. The recessed region 162 defines an internal tapered surface 166 in the plug 26 adjacent the throat region 160.

The plug 26 further includes external surfaces 168 and 170 formed in opposing end portions thereof. The external surface 154 extends axially between the external surfaces 168 and 170. In some embodiments, at least respective portions of the external surfaces 168 and 170 are tapered, curved, rounded, or otherwise shaped to conformingly engage the seat 28. A sealing groove 172 is formed in the external surface 154 to facilitate a sealing engagement between the plug 26 and the nose 22 when the plug 26 is connected to the stem 24. In some embodiments, the plug 26 is substantially symmetrical about a plane 173 perpendicularly intersecting its axis 153. In such embodiments, the external surfaces 168 and 170 are substantially identical, the recessed regions 158 and 162 are substantially identical, and the internal tapered surfaces 164 and 166 are substantially identical. As a result, the plug 26 is reversibly connected to the stem 24.

Figure 10:
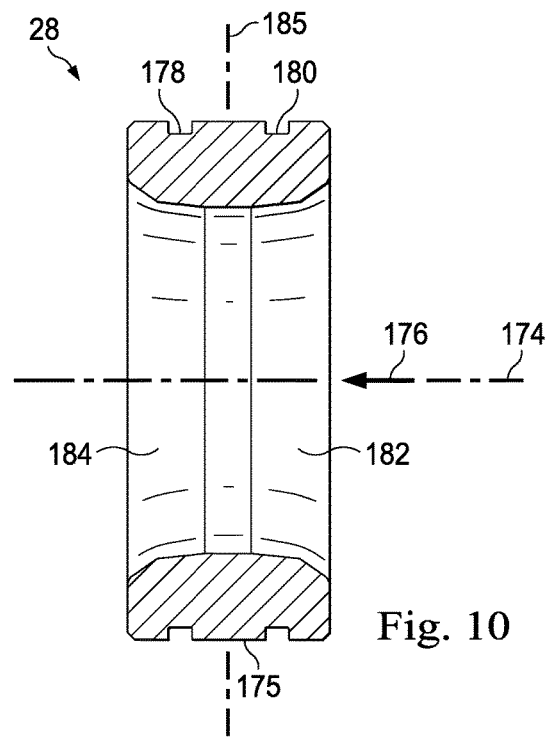
FIG. 10 is a cross-sectional view illustrating the seat of FIG. 2, according to one or more embodiments.

Referring to FIG. 10, with continuing reference to FIG. 2, an illustrative embodiment of the seat 28 is shown. The seat 28 extends along an axis 174 and includes an external surface 175 and an internal passage 176. In some embodiments, the external surface 175 is generally cylindrical. A sealing groove 178 is formed in the external surface 175 to facilitate a sealing engagement between the seat 28 and the choke body 12. In addition to, or instead of, the sealing groove 178, a sealing groove 180 may be formed in the external surface 175 to facilitate the sealing engagement between the seat 28 and the choke body 12. The internal passage 176 extends axially through the seat 28. In some embodiments, the internal passage 176 defines internal surfaces 182 and 184 in opposing end portions of the seat 28. In some embodiments, at least respective portions of the internal surfaces 182 and 184 are tapered, curved, rounded, or otherwise shaped to conformingly engage the plug 26. In some embodiments, the seat 28 is substantially symmetrical about a plane 185 perpendicularly intersecting its axis 174. In such embodiments, the sealing grooves 178 and 180 are substantially identical, and the internal surfaces 182 and 184 are substantially identical. As a result, the seat 28 is reversible within the enlarged-diameter region 40 of the outlet passage 34.

Figure 11:
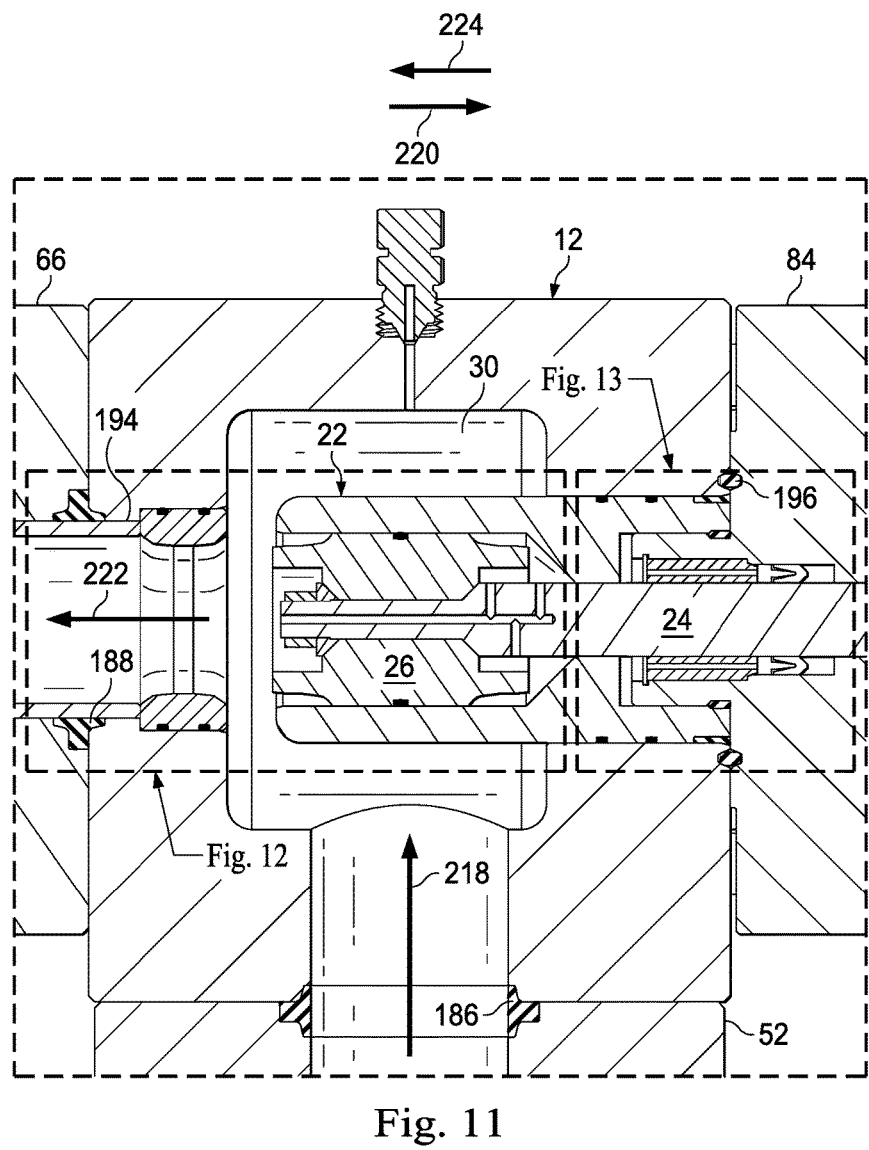
FIG. 11 is an enlarged view of a portion of the drilling choke of FIG. 2 in a first operational configuration, according to one or more embodiments.
Figure 12:
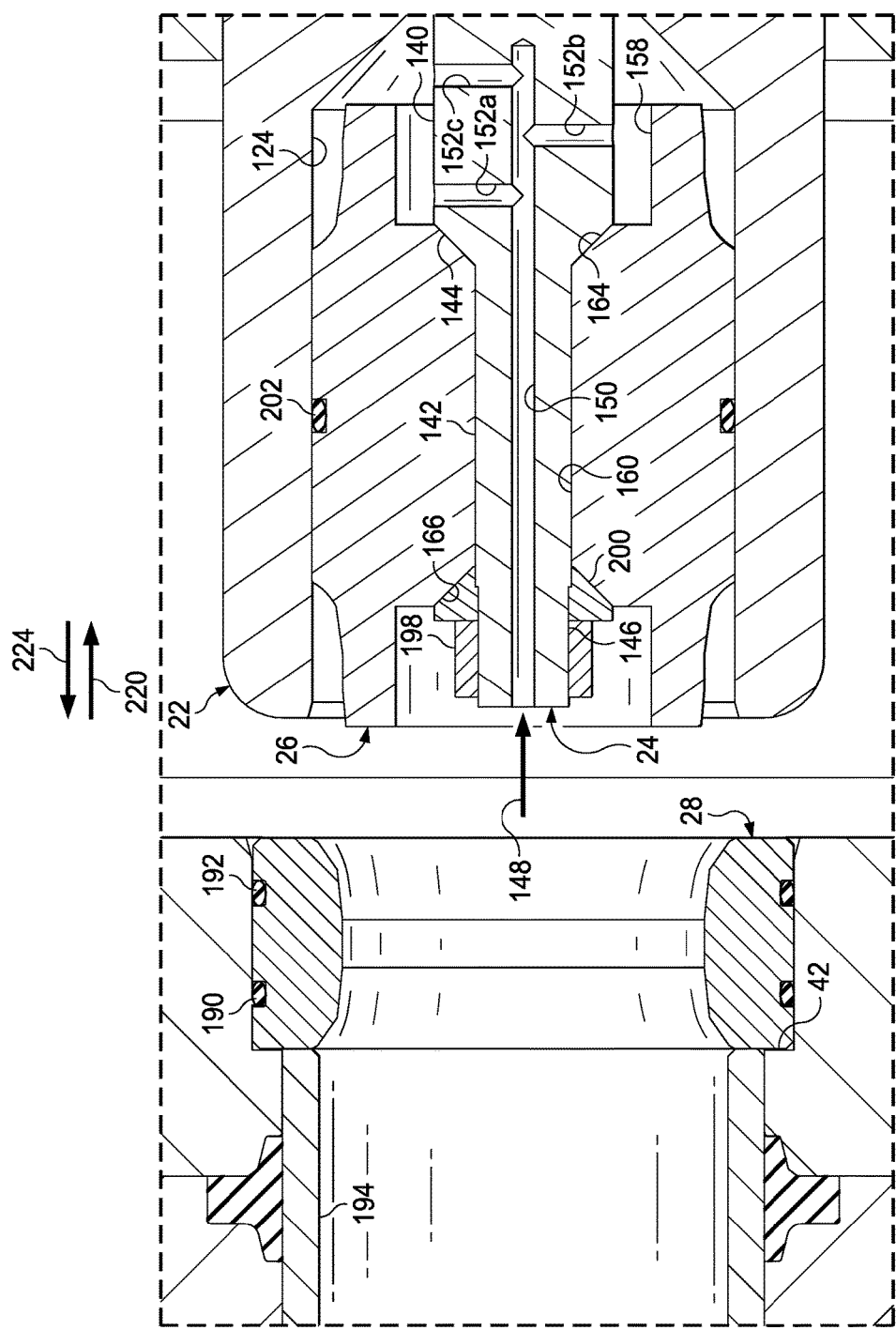
FIG. 12 is an enlarged view of a portion of the drilling choke of FIG. 11, according to one or more embodiments.
Figure 13:
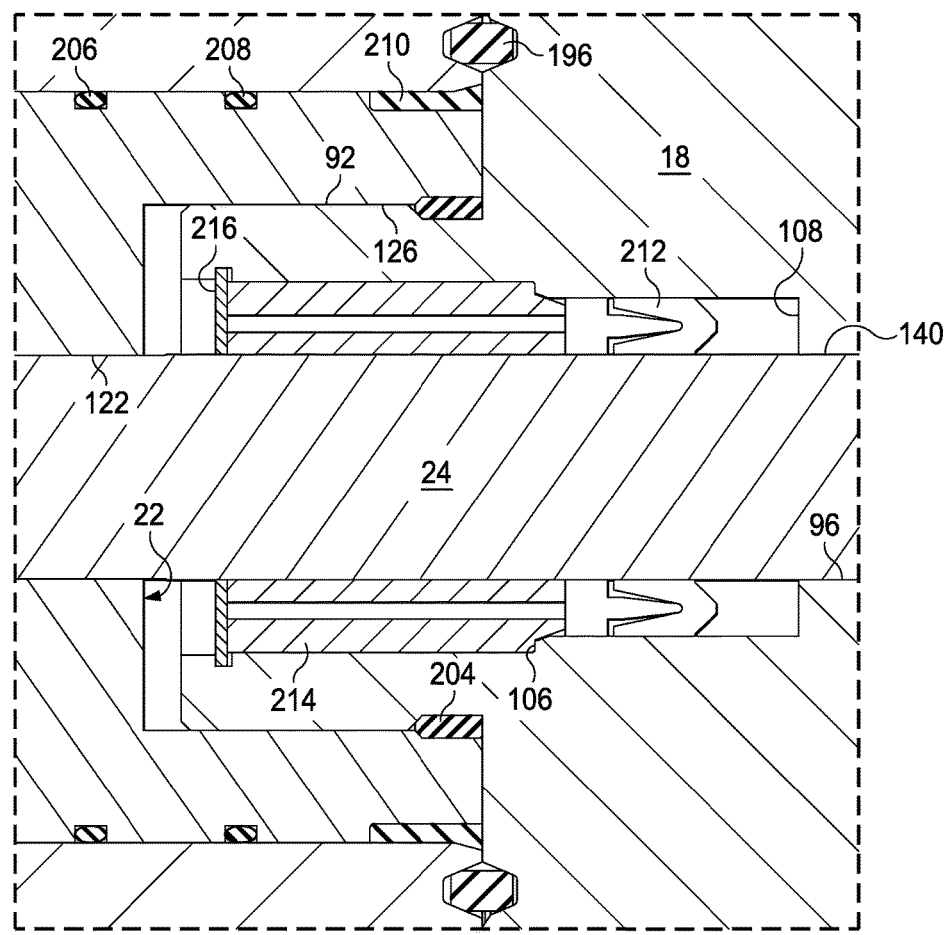
FIG. 13 is an enlarged view of another portion of the drilling choke of FIG. 11, according to one or more embodiments.

Referring to FIGS. 11-13, with continuing reference to FIGS. 1-10, an illustrative embodiment of the drilling choke 10 is shown in an assembled state. In the assembled state, the inlet leg 14 is connected to the choke body 12 by the plurality of fasteners 62 (shown in FIGS. 1 and 2) extending through the through-holes in the flange 52 and threadably engaging the threaded-holes around the inlet passage 32 in the choke body 12. As shown in FIG. 11, the connecting of the inlet leg 14 to the choke body 12 via the plurality of fasteners 62 sealingly engages a seal 186 (extending within the sealing groove 38 of the choke body 12 and the sealing groove 58 of the inlet leg 14) with the inlet leg 14 and the choke body 12.

The outlet leg 16 is connected to the choke body 12 by the plurality of fasteners 80 (shown in FIGS. 1 and 2) extending through the through-holes in the flange 66 and threadably engaging the threaded-holes around the outlet passage 34 in the choke body 12. The connecting of the outlet leg 16 to the choke body 12 via the plurality of fasteners 80 sealingly engages a seal 188 (extending within the sealing groove 44 of the choke body 12 and the sealing groove 76 of the outlet leg 16) with the outlet leg 16 and the choke body 12. The seat 28 is accommodated within the enlarged-diameter region 40 adjacent the internal shoulder 42 of the choke body 12 so that the seat 28 and the choke body 12 are sealingly engaged by seals 190 and 192 (extending within the respective sealing grooves 178 and 180 of the seat 28). The enlarged-diameter region 72 of the outlet leg 16 accommodates a bushing 194 (fully visible in FIG. 2) adjacent the internal shoulder 74. In some embodiments, the seal 188 engages the bushing 194. In some embodiments, the bushing 194 extends within the outlet passage 34 of the choke body 12 and engages (or nearly engages) the seat 28.

The actuator cap 18 is connected to the choke body 12 by the plurality of fasteners 114 (shown in FIG. 1) extending through the through-holes in the flange 84 and threadably engaging the threaded-holes around the actuator bore 36 in the choke body 12. The connecting of the actuator cap 18 to the choke body 12 via the plurality of fasteners 114 sealingly engages a seal 196 (extending within the sealing groove 46 of the choke body 12 and the sealing groove 112 of the actuator cap 18) with the actuator cap 18 and the choke body 12.

As shown in FIG. 12, the plug 26 extends within the recessed region 124 of the nose 22. The reduced-diameter portion 142 of the stem 24 extends through the throat region 160 of the plug 26 so that the external tapered surface 144 of the stem 24 engages the internal tapered surface 164 of the plug 26. The plug 26 is connected to the stem 24 via a nut 198 that threadably engages the external threaded connection 146 of the stem 24. The nut 198 urges a tapered washer 200 to engage the internal tapered surface 166 of the plug 26. The plug 26 is thereby trapped between the tapered washer 200 and the external tapered surface 144 of the stem 24. Since the plug 26 is connected to the stem 24, the stem 24 supports the plug 26 within the recessed region 124 of the nose 22. The manner in which the stem 24 supports the plug 26 within the recessed region 124 of the nose 22 sealingly engages a seal 202 (extending within the sealing groove 172 of the plug 26) with the nose 22 and the plug 26. The axially-extending portion 150 of the internal passage 148 of the stem 24 is in fluid communication with the recessed region 158 of the plug 26 (and the recessed region 124 of the nose 22) via the laterally-extending portions 152a-c. The seal 202's sealing engagement with the nose 22 and the plug 26 in combination with the internal passage 148's fluid communication with the recessed region 158 of the nose 22 facilitates pressure balancing of the plug 26 during operation, as will be discussed in further detail below.

As shown in FIG. 13, the nose 22 is connected to the actuator cap 18 via threaded engagement between the internal threaded connection 126 of the nose 22 and the external threaded connection 92 of the actuator cap 18. The manner in which the nose 22 is connected to the actuator cap 18 engages a debris seal 204 (extending within the sealing groove 110 of the actuator cap 18 and the sealing groove 130 of the nose 22) with the actuator cap 18 and the nose 22 to thereby exclude debris from the packing box 94. Since the nose 22 is connected to the actuator cap 18, the connecting of the actuator cap 18 to the choke body 12 via the plurality of fasteners 114 supports the nose 22 within the actuator bore 36 and the internal region 30 of the choke body 12. The manner in which the nose 22 is supported within the actuator bore 36 sealingly engages seals 206 and 208 (extending within the respective sealing grooves 134 and 136 of the nose 22) with the nose 22 and the choke body 12, and engages a debris seal 210 (extending within the sealing groove 138 of the nose 22) with the nose 22 and the choke body 12 to thereby exclude debris from the sealing grooves 134 and 136.

The enlarged-diameter portion 140 of the stem 24 extends through the throat region 122 of the nose 22, the packing box 94, and the throat region 96 of the actuator cap 18. As a result, the enlarged-diameter portion 140 of the stem 24 extends within the recessed region 98 of the actuator cap 18 (not shown in FIG. 11) and is coupleable to the actuator 20. In some embodiments, the packing box 94 includes packing material 212, a bushing 214, and a retainer 216. The packing material 212 and the bushing 214 extend about the enlarged-diameter portion 140 of the stem 24. The packing material 212 is disposed within the reduced-diameter region 104 of the packing box 94 adjacent the internal shoulder 108. The bushing 214 is disposed within the enlarged-diameter region 102 of the packing box 94 adjacent the internal shoulder 106. The retainer 216 retains the packing material 212 and the bushing 214 within the packing box 94. The packing material 212 sealingly engages the enlarged-diameter portion 140 of the stem 24 while, at the same time, permitting axial (and rotational) movement of the stem 24 relative to the actuator cap 18. As a result, when the internal passage 148 of the stem 24 communicates fluidically with the recessed region 124 of the nose 22, the packing material 212 prevents fluid migration from the recessed region 124 of the nose 22 to the recessed region 98 of the actuator cap 18.

Figure 14:
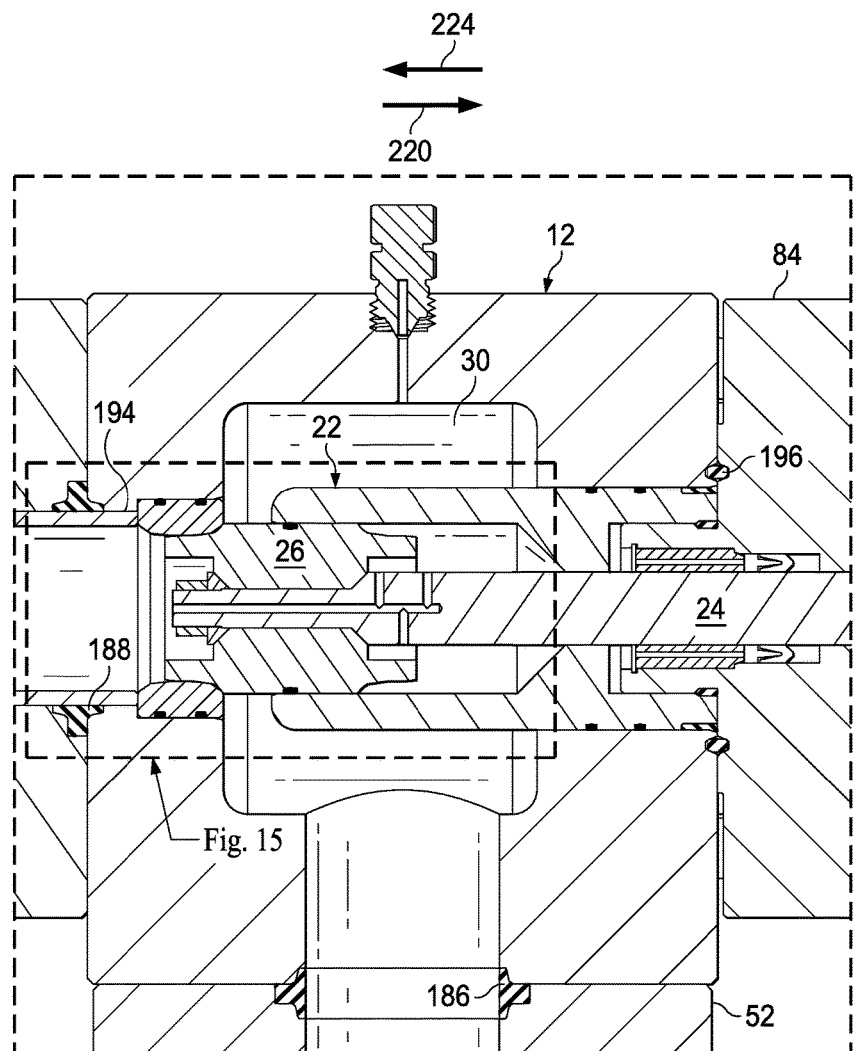
FIG. 14 is a view similar to that illustrated in FIG. 11, except that the drilling choke is shown in a second operational configuration, according to one or more embodiments.
Figure 15:
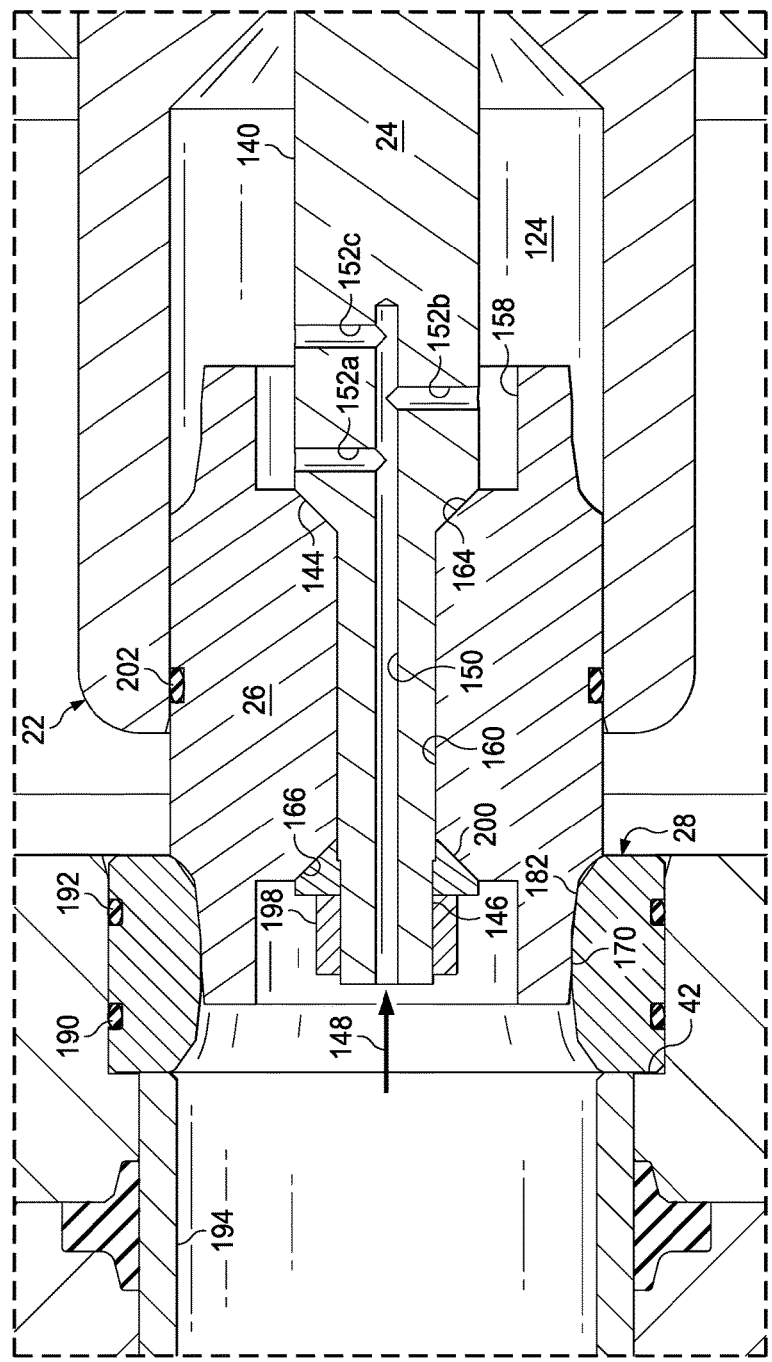
FIG. 15 is an enlarged view of a portion of the drilling choke of FIG. 14, according to one or more embodiments.

The operation of the drilling choke 10 is exemplified in FIGS. 11-15 (with reference to FIGS. 1 and 2), during which operation the drilling choke 10 is adjustable to, for example, maintain the desired backpressure within the wellbore. The drilling mud is communicated from the wellbore to the internal region 30 of the choke body 12 via the internal passage 56 of the inlet leg 14 and the inlet passage 32 of the choke body 12, as indicated by arrow 218. The drilling choke 10 is adjustable between an open configuration (shown in FIGS. 1, 2, 11, and 12) and a closed configuration (shown in FIGS. 14 and 15) to maintain the desired backpressure within the wellbore. In the open configuration, the stem 24 is moved axially in a direction 220 so that the plug 26 is retracted into the recessed region 124 of the nose 22, as shown in FIGS. 2, 11, and 12. The manner in which the plug 26 is retracted into the recessed region 124 of the nose 22 permits discharge of the drilling mud from the internal region 30 of the choke body 12 without substantial interference from the plug 26. The drilling mud is discharged through the internal passage 176 of the seat 28, the outlet passage 34 of the choke body 12, the bushing 194, and the internal passage 70 of the outlet leg 16, as indicated by arrow 222. In the closed configuration, the stem 24 is moved axially in a direction 224, which is opposite the direction 220, so that the plug 26 is extended out of the recessed region 124 of the nose 22 and engaged with the seat 28, as shown in FIGS. 14 and 15. The external surface 170 (or the external surface 168) of the plug 26 engages the internal surface 182 (or the internal surface 184) of the seat 28 to prevent, or at least reduce, the discharge of the drilling mud from the internal region 30 of the choke body 12 via the outlet passage 34 of the choke body 12 and the internal passage 70 of the outlet leg 16.

During the adjustment of the drilling choke 10 between the open configuration and the closed configuration, the plug 26 restricts (or chokes) the discharge of the drilling mud from the internal region 30 of the choke body 12 and through the internal passage 176 of the seat 28. More particularly, when the plug 26 is extended out of the recessed region 124 of the nose 22, but is not yet engaged with the seat 28 (i.e., the plug 26 is spaced apart from the seat 28), the flow of the drilling mud from the internal region 30 of the choke body 12 through the internal passage 176 of the seat 28 is impeded by the plug 26. Accordingly, the stem 24 is axially moveable in the directions 220 and 224 to decrease or increase the degree to which the plug 26 impedes the flow of the drilling mud from the internal region 30 of the choke body 12 through the internal passage 176 of the seat 28. Thus, the axial movement of the stem 24 in the directions 220 and 224 can be used to control the backpressure of the drilling mud within the wellbore. The axial movement of the stem 24 in the direction 224 causes the plug 26 to approach the seat 28; the plug 26's approach to the seat 28 produces increased turbulence in the flow of the drilling mud through the internal passage 176 of the seat 28 and into the bushing 194. In some embodiments, the bushing 194 protects the choke body 12 and the outlet leg 16 from such increased turbulence to thereby prevent the drilling mud from wearing and eroding the choke body 12 and the outlet leg 16. In addition to protecting the choke body 12 and the outlet leg 16, the bushing 194 may also protect the seal 188 from such increased turbulence. The plug 26's approach to the seat 28 also creates a pressure differential between the internal region 30 of the choke body 12 and the internal passage 176 of the seat 28, which pressure differential further urges the plug 26 toward the seat 28 in the direction 224.

Furthermore, engagement of the plug 26 with the seat 28 (i.e., when the drilling choke 10 is in the closed configuration) elevates the pressure differential between the internal region 30 of the choke body 12 and the internal passage 176 of the seat 28; the degree to which this pressure differential is elevated can make it difficult to unseat the plug 26 from the seat 28. To alleviate any such difficulties in unseating the plug 26 from the seat 28, fluid (i.e., the drilling mud) is communicated from the internal passage 176 of the seat 28 to the recessed region 158 of the plug 26 (and the recessed region 124 of the nose 22) via the internal passage 148 of the stem 24. This fluid communication via the internal passage 148 of the stem 24 balances the respective pressures acting on opposing end portions of the plug 26 (i.e., pressure balances the plug 26). As a result, the pressure differential between the internal region 30 of the choke body 12 and the internal passage 176 of the seat 28 is neutralized. As a result, even during the plug 26's approach to, and engagement with, the seat 28, the stem 24 can be readily moved in the directions 220 and 224 to control the backpressure of the drilling mud within the wellbore.

In some embodiments, rather than being formed in the external surface 154 of the plug 26, the sealing groove 172 may be formed in the interior of the nose 22 so that the manner in which the stem 24 supports the plug 26 within the recessed region 124 of the nose 22 sealingly engages the seal 202 (extending within the sealing groove 172 of the nose 22) with the plug 26 and the nose 22. In some embodiments, rather than being formed in the external surface of the seat 28, the sealing grooves 178 and 180 may be formed in the interior of the choke body 12 so that the seat 28 and the choke body 12 are sealingly engaged by the seals 190 and 192 (extending within the respective sealing grooves 178 and 180 of the choke body 12). In some embodiments, rather than being formed in the external surface 116 of the nose 22, the sealing grooves 134 and 136 may be formed in the interior of the choke body 12 so that the manner in which the nose 22 is supported within the actuator bore 36 sealingly engages the seals 206 and 208 (extending within the respective sealing grooves 134 and 136 of the choke body 12) with the nose 22 and the choke body 12.

In some embodiments, the configuration of the drilling choke 10 (e.g., the pressure balancing of the plug 26) increases the efficiency of drilling operations, especially for operators dealing with challenges such as, for example, continuous duty operations, harsh downhole environments, and multiple extended-reach lateral wells, among others. In some embodiments, the plug 26 is readily unseatable from the seat 28 due to the above-described pressure balancing of the plug 26, which pressure balancing is facilitated by the outlet passage 34's fluid communication with the recessed region 158 via the internal passage 148 (in combination with the seal 202's sealing engagement with the nose 22 and the plug 26). In some embodiments, the configuration of the drilling choke 10 (e.g., the pressure balancing of the plug 26) reduces wear and erosion to the various components of the drilling choke 10, thereby decreasing costs associated with maintenance and downtime. Moreover, the reversibility of the plug 26 and/or the seat 28 decreases costs associated with replacement parts. In some embodiments, the configuration of the drilling choke 10, including the reversibility of the plug 26 and/or the seat 28, makes it easier to inspect, service, or repair the drilling choke 10, and/or to coordinate the inspection, service, repair, or replacement of the drilling choke 10.

Referring to FIGS. 16 and 17, with continuing reference to FIG. 2, in some embodiments, the nose 22 and the stem 24 are omitted and replaced with a nose 226 and a stem 228. The nose 226 includes several features that are substantially identical to corresponding features of the nose 22, which substantially identical features are given the same reference numerals. However, the internal passage 118 of the nose 226 does not include a throat region that corresponds to the throat region 122 of the nose 22. Instead, the internal passage 118 of the nose 226 includes an enlarged-diameter region 230 extending between the recessed region 124 and the receptacle region 120, as shown in FIG. 16. The enlarged-diameter region 230 defines an internal tapered surface 232 in the nose 226 adjacent the recessed region 124. As a result, when the drilling choke 10 is assembled, the enlarged-diameter portion 140 of the stem 24 no longer extends through the throat region 122 of the nose 22, but instead extends through the enlarged-diameter region 230 of the nose 226. As shown in FIG. 17, the stem 228 includes several features that are substantially identical to corresponding features of the stem 24, which substantially identical features are given the same reference numerals. However, the stem 228 includes wrench flats 234 formed in the enlarged-diameter portion 142 thereof. The wrench flats 234 are adapted to facilitate efficient assembly and disassembly of the drilling choke 10. More particularly, when assembling or disassembling the drilling choke 10 for inspection, service, or repair, the wrench flats 234 may be engaged by a wrench (not shown) to facilitate threaded engagement or disengagement of the nut 198 from the external threaded connection 146 of the stem 24. In some embodiments, such engagement between the wrench and the wrench flats 234 is facilitated by the enlarged-diameter region 230 of the nose 226, as shown in FIG. 16.

In a first aspect, the present disclosure introduces a drilling choke, including a choke body defining an internal region, an inlet passage, and an outlet passage; a seat extending within the outlet passage; a nose extending within the internal region and defining a recessed region; a plug extending within the recessed region, the plug being adapted to engage the seat to at least partially restrict fluid flow from the inlet passage to the outlet passage via the internal region; and a stem connected to the plug and extending axially therethrough, the stem defining an internal passage; wherein, when the plug engages the seat, the recessed region of the nose is in fluid communication with the outlet passage of the choke body via the internal passage of the stem to thereby pressure balance the plug. In some embodiments, the plug defines a sealing groove; and the drilling choke further includes a seal extending within the sealing groove of the plug, the seal sealingly engaging the plug and the nose. In some embodiments, the plug is further adapted to be spaced apart from the seat to permit the fluid flow from the inlet passage to the outlet passage via the internal region. In some embodiments, the drilling choke further includes an outlet leg connected to the choke body and defining an internal passage in fluid communication with the outlet passage; and a bushing extending within the internal passage of the outlet leg and the outlet passage of the choke body; wherein, when the plug is spaced apart from the seat, the bushing acts as a barrier protecting at least respective portions of the choke body and the outlet leg from turbulence in the fluid flow. In some embodiments, the stem and the plug are together axially moveable in opposing directions relative to the seat to thereby control a backpressure of the fluid flow. In some embodiments, the internal passage of the stem includes an axially-extending portion and one or more laterally-extending portions. In some embodiments, the stem includes an enlarged-diameter portion and a reduced diameter portion, the axially-extending portion of the internal passage extending axially through the reduced-diameter portion and into the enlarged-diameter portion, and the one or more laterally-extending portions of the internal passage extending from the axially-extending portion and through at least part of the enlarged-diameter portion. In some embodiments, the stem further includes an external tapered surface extending axially between the enlarged-diameter portion and the reduced-diameter portion; and the plug includes an internal tapered surface engaged by the external tapered surface of the stem so that the reduced-diameter portion of the stem extends axially through the plug. In some embodiments, the plug is reversible within the internal region and/or the seat is reversible within the outlet passage. In some embodiments, the seat is substantially symmetrical about a plane perpendicularly intersecting its axis. In some embodiments, the plug is substantially symmetrical about a plane perpendicularly intersecting its axis.

In a second aspect, the present disclosure introduces a drilling choke, including a choke body defining an internal region, an inlet passage, and an outlet passage; a seat extending within the outlet passage; a plug extending within the internal region, the plug being adapted to be spaced apart from the seat to permit fluid flow from the inlet passage to the outlet passage via the internal region; an outlet leg connected to the choke body and defining an internal passage in fluid communication with the outlet passage; and a bushing extending within the internal passage of the outlet leg and the outlet passage of the choke body; wherein, when the plug is spaced apart from the seat, the bushing acts as a barrier protecting at least respective portions of the choke body and the outlet leg from turbulence in the fluid flow. In some embodiments, the internal passage includes an enlarged-diameter region forming an internal shoulder in the outlet leg, the bushing extending within the enlarged-diameter region adjacent the internal shoulder. In some embodiments, the plug is further adapted to engage the seat to at least partially restrict the fluid flow from the inlet passage to the outlet passage via the internal region. In some embodiments, the plug is axially moveable in opposing directions relative to the seat to thereby control a backpressure of the fluid flow. In some embodiments, the drilling choke further includes a stem connected to the plug and extending axially therein, the stem including an enlarged-diameter portion, a reduced diameter portion, and an external tapered surface extending axially between the enlarged-diameter portion and the reduced-diameter portion; wherein the plug includes an internal tapered surface engaged by the external tapered surface of the stem so that the reduced-diameter portion of the stem extends axially within the plug. In some embodiments, the plug is reversible within the internal region and/or the seat is reversible within the outlet passage. In some embodiments, the seat is substantially symmetrical about a plane perpendicularly intersecting its axis. In some embodiments, the plug is substantially symmetrical about a plane perpendicularly intersecting its axis.

In a third aspect, the present disclosure introduces a drilling choke, including a choke body defining an internal region, and inlet passage, and an outlet passage; a seat extending within the outlet passage; a plug extending within the internal region, the plug being adapted to be spaced apart from the seat to permit fluid flow from the inlet passage to the outlet passage via the internal region; wherein: the plug is reversible within the internal region and/or the seat is reversible within the outlet passage. In some embodiments, the plug is substantially symmetrical about a plane perpendicularly intersecting its axis. In some embodiments, the seat is substantially symmetrical about a plane perpendicularly intersecting its axis. In some embodiments, the plug is further adapted to engage the seat to at least partially restrict the fluid flow from the inlet passage to the outlet passage via the internal region. In some embodiments, the plug is axially moveable in opposing directions relative to the seat to thereby control a backpressure of the fluid flow. In some embodiments, the drilling choke further includes a stem connected to the plug and extending axially therein, the stem including an enlarged-diameter portion, a reduced diameter portion, and an external tapered surface extending axially between the enlarged-diameter portion and the reduced-diameter portion; wherein the plug includes an internal tapered surface engaged by the external tapered surface of the stem so that the reduced-diameter portion of the stem extends axially within the plug.

In a fourth aspect, the present disclosure introduces a drilling choke, including a choke body defining an internal region, an inlet passage, and an outlet passage; a seat extending within the outlet passage; a nose extending within the internal region and defining a recessed region; a plug extending within the recessed region and defining a sealing groove, the plug being adapted to be spaced apart from the seat to permit fluid flow from the inlet passage to the outlet passage via the internal region; and a seal extending within the sealing groove of the plug, the seal sealingly engaging the plug and the nose. In some embodiments, the plug is further adapted to engage the seat to at least partially restrict the fluid flow from the inlet passage to the outlet passage via the internal region. In some embodiments, the plug is axially moveable in opposing directions relative to the seat to thereby control a backpressure of the fluid flow. In some embodiments, the drilling choke further includes a stem connected to the plug and extending axially therein, the stem including an enlarged-diameter portion, a reduced diameter portion, and an external tapered surface extending axially between the enlarged-diameter portion and the reduced-diameter portion; wherein the plug includes an internal tapered surface engaged by the external tapered surface of the stem so that the reduced-diameter portion of the stem extends axially within the plug. In some embodiments, the plug is reversible within the internal region and/or the seat is reversible within the outlet passage.

It is understood that variations may be made in the foregoing without departing from the scope of the present disclosure.

In some embodiments, the elements and teachings of the various embodiments may be combined in whole or in part in some or all of the embodiments. In addition, one or more of the elements and teachings of the various embodiments may be omitted, at least in part, and/or combined, at least in part, with one or more of the other elements and teachings of the various embodiments.

In some embodiments, while different steps, processes, and procedures are described as appearing as distinct acts, one or more of the steps, one or more of the processes, and/or one or more of the procedures may also be performed in different orders, simultaneously and/or sequentially. In some embodiments, the steps, processes and/or procedures may be merged into one or more steps, processes and/or procedures.

In some embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

In the foregoing description of certain embodiments, specific terminology has been resorted to for the sake of clarity. However, the disclosure is not intended to be limited to the specific terms so selected, and it is to be understood that each specific term includes other technical equivalents which operate in a similar manner to accomplish a similar technical purpose. Terms such as "left" and right", "front" and "rear", "above" and "below" and the like are used as words of convenience to provide reference points and are not to be construed as limiting terms.

In this specification, the word "comprising" is to be understood in its "open" sense, that is, in the sense of "including", and thus not limited to its "closed" sense, that is the sense of "consisting only of". A corresponding meaning is to be attributed to the corresponding words "comprise", "comprised" and "comprises" where they appear.

Although some embodiments have been described in detail above, the embodiments described are illustrative only and are not limiting, and those skilled in the art will readily appreciate that many other modifications, changes and/or substitutions are possible in the embodiments without materially departing from the novel teachings and advantages of the present disclosure. Accordingly, all such modifications, changes, and/or substitutions are intended to be included within the scope of this disclosure as defined in the following claims. In the claims, any means-plus-function clauses are intended to cover the structures described herein as performing the recited function and not only structural equivalents, but also equivalent structures. Moreover, it is the express intention of the applicant not to invoke 35 U.S.C. § 112, paragraph 6 for any limitations of any of the claims herein, except for those in which the claim expressly uses the word "means" together with an associated function.

What is claimed is:

1. A drilling choke, comprising:
   a choke body defining an internal region, an inlet passage, and an outlet passage;

a seat extending within the outlet passage;
a nose extending within the internal region and defining a recessed region;
a plug extending within the recessed region and defining an internal passage extending axially through the plug, the plug being adapted to engage the seat to at least partially restrict fluid flow from the inlet passage to the outlet passage via the internal region;
a seal extending between the nose and the plug; and
a stem connected to the plug and moveable relative to the nose to thereby engage the plug with the seat, the stem defining an internal passage and extending axially within the internal passage of the plug;
wherein the stem supports the plug within the recessed region of the nose;
wherein the manner in which the stem supports the plug within the recessed region of the nose sealingly engages the seal with the nose and the plug;
wherein the internal passage of the stem comprises an axially-extending portion and one or more laterally-extending portions;
wherein the axially-extending portion of the internal passage of the stem is in fluid communication with the recessed region of the nose via the one or more laterally-extending portions of the internal passage of the stem;
wherein, when the plug engages the seat, the recessed region of the nose is in fluid communication with the outlet passage of the choke body via the internal passage of the stem, and the seal sealingly engages with the nose and the plug, to thereby pressure balance the plug thereacross and between the recessed region of the nose and the outlet passage of the choke body; and
wherein, when the plug engages the seat, the pressure balance across the plug and between the recessed region of the nose and the outlet passage of the choke body facilitates subsequent disengagement of the plug from the seat.

2. The drilling choke of claim 1, wherein the plug defines a sealing groove; and
wherein the seal extends within the sealing groove of the plug to sealingly engage the plug and the nose.

3. The drilling choke of claim 1, wherein the plug is further adapted to be spaced apart from the seat to permit the fluid flow from the inlet passage to the outlet passage via the internal region.

4. The drilling choke of claim 3, further comprising:
an outlet leg connected to the choke body and defining an internal passage in fluid communication with the outlet passage; and
a bushing extending within the internal passage of the outlet leg and the outlet passage of the choke body;
wherein, when the plug is spaced apart from the seat, the bushing acts as a barrier protecting at least respective portions of the choke body and the outlet leg from turbulence in the fluid flow.

5. The drilling choke of claim 3, wherein the stem and the plug are together axially moveable in opposing directions relative to the seat to thereby control a backpressure of the fluid flow.

6. The drilling choke of claim 1, wherein the stem comprises an enlarged-diameter portion and a reduced diameter portion, the axially-extending portion of the internal passage extending axially through the reduced-diameter portion and into the enlarged-diameter portion, and the one or more laterally-extending portions of the internal passage extending from the axially-extending portion and through at least part of the enlarged-diameter portion.

7. The drilling choke of claim 6, wherein the stem further comprises an external tapered surface extending axially between the enlarged-diameter portion and the reduced-diameter portion; and wherein the plug comprises an internal tapered surface engaged by the external tapered surface of the stem so that the reduced-diameter portion of the stem extends axially through the plug.

8. The drilling choke of claim 1, wherein the plug is reversible within the internal region and/or the seat is reversible within the outlet passage.

9. The drilling choke of claim 8, wherein the seat is substantially symmetrical about a plane perpendicularly intersecting an axis of the seat.

10. The drilling choke of claim 8, wherein the plug is substantially symmetrical about a plane perpendicularly intersecting an axis of the plug.

11. A drilling choke, comprising:
a choke body defining an internal region, an inlet passage, and an outlet passage;
a seat extending within the outlet passage;
a plug extending within the internal region, the plug being adapted to be spaced apart from the seat to permit fluid flow from the inlet passage to the outlet passage via the internal region;
wherein the plug is reversible within the internal region.

12. The drilling choke of claim 11, wherein the plug is substantially symmetrical about a plane perpendicularly intersecting an axis of the plug.

13. The drilling choke of claim 11,
wherein the seat is reversible within the outlet passage; and
wherein the seat is substantially symmetrical about a plane perpendicularly intersecting an axis of the seat.

14. The drilling choke of claim 11, wherein the plug is further adapted to engage the seat to at least partially restrict the fluid flow from the inlet passage to the outlet passage via the internal region.

15. The drilling choke of claim 14, wherein the plug is axially moveable in opposing directions relative to the seat to thereby control a backpressure of the fluid flow.

16. The drilling choke of claim 11, further comprising:
a stem connected to the plug and extending axially therein, the stem comprising an enlarged-diameter portion, a reduced diameter portion, and an external tapered surface extending axially between the enlarged-diameter portion and the reduced-diameter portion;
wherein the plug comprises an internal tapered surface engaged by the external tapered surface of the stem so that the reduced-diameter portion of the stem extends axially within the plug.

17. A drilling choke, comprising:
a choke body defining an internal region, an inlet passage, and an outlet passage;
a seat extending within the outlet passage;
a nose extending within the internal region and defining a recessed region;
a plug extending within the recessed region, the plug being adapted to engage the seat to at least partially restrict fluid flow from the inlet passage to the outlet passage via the internal region; and
a stem connected to the plug and extending axially therethrough, the stem defining an internal passage;
wherein, when the plug engages the seat, the recessed region of the nose is in fluid communication with the outlet passage of the choke body via the internal passage of the stem to thereby pressure balance the plug;

wherein the internal passage of the stem comprises an axially-extending portion and one or more laterally-extending portions; and wherein the stem comprises an enlarged-diameter portion and a reduced diameter portion, the axially-extending portion of the internal passage extending axially through the reduced-diameter portion and into the enlarged-diameter portion, and the one or more laterally-extending portions of the internal passage extending from the axially-extending portion and through at least part of the enlarged-diameter portion.

18. The drilling choke of claim 17, wherein the stem further comprises an external tapered surface extending axially between the enlarged-diameter portion and the reduced-diameter portion; and wherein the plug comprises an internal tapered surface engaged by the external tapered surface of the stem so that the reduced-diameter portion of the stem extends axially through the plug.

19. The drilling choke of claim 17, wherein the plug defines a sealing groove; and wherein the drilling choke further comprises a seal extending within the sealing groove of the plug, the seal sealingly engaging the plug and the nose.

20. The drilling choke of claim 17, wherein the plug is further adapted to be spaced apart from the seat to permit the fluid flow from the inlet passage to the outlet passage via the internal region;

wherein the drilling choke further comprises:
an outlet leg connected to the choke body and defining an internal passage in fluid communication with the outlet passage; and
a bushing extending within the internal passage of the outlet leg and the outlet passage of the choke body; and wherein, when the plug is spaced apart from the seat, the bushing acts as a barrier protecting at least respective portions of the choke body and the outlet leg from turbulence in the fluid flow.

21. The drilling choke of claim 20, wherein the stem and the plug are together axially moveable in opposing directions relative to the seat to thereby control a backpressure of the fluid flow.

22. The drilling choke of claim 17, wherein the plug is reversible within the internal region; and wherein the plug is substantially symmetrical about a plane perpendicularly intersecting an axis of the plug.

23. The drilling choke of claim 17, wherein the seat is reversible within the outlet passage; and wherein the seat is substantially symmetrical about a plane perpendicularly intersecting an axis of the seat.

24. A drilling choke, comprising:
a choke body defining an internal region, an inlet passage, and an outlet passage;
a seat extending within the outlet passage;
a plug extending within the internal region, the plug being adapted to be spaced apart from the seat to permit fluid flow from the inlet passage to the outlet passage via the internal region;
wherein the plug is reversible within the internal region and/or the seat is reversible within the outlet passage; and
wherein the plug is substantially symmetrical about a plane perpendicularly intersecting an axis of the plug.

25. The drilling choke of claim 24, wherein the plug is further adapted to engage the seat to at least partially restrict the fluid flow from the inlet passage to the outlet passage via the internal region.

26. The drilling choke of claim 25, wherein the plug is axially moveable in opposing directions relative to the seat to thereby control a backpressure of the fluid flow.

27. The drilling choke of claim 24, further comprising:
a stem connected to the plug and extending axially therein, the stem comprising an enlarged-diameter portion, a reduced diameter portion, and an external tapered surface extending axially between the enlarged-diameter portion and the reduced-diameter portion;
wherein the plug comprises an internal tapered surface engaged by the external tapered surface of the stem so that the reduced-diameter portion of the stem extends axially within the plug.

28. A drilling choke, comprising:
a choke body defining an internal region, an inlet passage, and an outlet passage;
a seat extending within the outlet passage;
a plug extending within the internal region, the plug being adapted to be spaced apart from the seat to permit fluid flow from the inlet passage to the outlet passage via the internal region; and
a stem connected to the plug and extending axially therein, the stem comprising an enlarged-diameter portion, a reduced diameter portion, and an external tapered surface extending axially between the enlarged-diameter portion and the reduced-diameter portion;
wherein the plug comprises an internal tapered surface engaged by the external tapered surface of the stem so that the reduced-diameter portion of the stem extends axially within the plug.

29. The drilling choke of claim 28, wherein the stem defines an internal passage so that, when the plug engages the seat, the recessed region of the nose is in fluid communication with the outlet passage of the choke body via the internal passage of the stem to thereby pressure balance the plug.

30. The drilling choke of claim 29, wherein the internal passage of the stem comprises an axially-extending portion and one or more laterally-extending portions.

* * * * *